US012370821B2

(12) United States Patent
Sarkinen et al.

(10) Patent No.: US 12,370,821 B2
(45) Date of Patent: Jul. 29, 2025

(54) PLASTIC CARD PRINTING WITH RADIATION CURABLE MATERIAL AND MULTIPLE CURING PASSES

(71) Applicant: Entrust Corporation, Shakopee, MN (US)

(72) Inventors: Daniel Sarkinen, Shakopee, MN (US); Ethan Yanna, Shakopee, MN (US); Don Galles, Shakopee, MN (US); Scott Svensson, Shakopee, MN (US); Bruce Klemann, Shakopee, MN (US)

(73) Assignee: ENTRUST CORPORATION, Shakopee, MN (US)

(*) Notice: Subject to any disclaimer, the term of this patent is extended or adjusted under 35 U.S.C. 154(b) by 162 days.

(21) Appl. No.: 17/811,395

(22) Filed: Jul. 8, 2022

(65) Prior Publication Data

US 2023/0021188 A1 Jan. 19, 2023

Related U.S. Application Data

(60) Provisional application No. 63/222,530, filed on Jul. 16, 2021.

(51) Int. Cl.
*B41M 7/00* (2006.01)
*B41J 3/407* (2006.01)
(Continued)

(52) U.S. Cl.
CPC ............ *B41M 7/0081* (2013.01); *B41J 3/407* (2013.01); *B41J 3/60* (2013.01); *B41J 11/0021* (2021.01);
(Continued)

(58) Field of Classification Search
CPC .............. B41M 7/0081; B41M 5/0052; B41M 5/0064; B41J 3/407; B41J 3/60; B41J 11/0021; B41J 13/12
See application file for complete search history.

(56) References Cited

U.S. PATENT DOCUMENTS 4,825,054 A 4/1989 Rust et al.
4,995,501 A 2/1991 Lundstrom et al.
(Continued)

FOREIGN PATENT DOCUMENTS

CN 202641017 U 1/2013
WO 2015-163259 A1 10/2015
WO 2018-076068 A1 5/2018

OTHER PUBLICATIONS

International Search Report and Written Opinion, International Patent Application No. PCT/IB2022/056355, Jul. 8, 2022 (14 pages).
(Continued)

*Primary Examiner* — Henok D Legesse
(74) *Attorney, Agent, or Firm* — Merchant & Gould P.C.

(57) ABSTRACT

Techniques are described for reducing or eliminating a bow in a plastic card that results from applying radiation, such as UV radiation, to a surface of the plastic card to cure radiation curable material that has been applied to the surface. In one embodiment, after printing of all radiation curable material on the plastic card is completed, radiation is applied to both surfaces of the plastic card. After applying the radiation, the plastic card complies with ISO 7810:2019, Clause 8.10.

19 Claims, 7 Drawing Sheets

(51) Int. Cl.

| | |
|---|---|
| ***B41J 3/60*** | (2006.01) |
| ***B41J 11/00*** | (2006.01) |
| ***B41J 13/12*** | (2006.01) |
| ***B41M 5/00*** | (2006.01) |

(52) U.S. Cl.

CPC ............ *B41J 13/12* (2013.01); *B41M 5/0052* (2013.01); *B41M 5/0064* (2013.01)

(56) References Cited

U.S. PATENT DOCUMENTS

| | | | |
|---|---|---|---|
| 5,266,781 | A | 11/1993 | Warwick et al. |
| 5,837,991 | A | 11/1998 | LaManna et al. |
| 5,943,238 | A | 8/1999 | Nioche et al. |
| 6,131,817 | A | 10/2000 | Miller |
| 6,476,840 | B1 | 11/2002 | Taylor et al. |
| 6,695,205 | B1 | 2/2004 | Lundstrom et al. |
| 6,783,067 | B2 | 8/2004 | Kreuter et al. |
| 6,850,263 | B2 | 2/2005 | Taylor et al. |
| 6,853,394 | B2 | 2/2005 | Taylor et al. |
| 6,902,107 | B2 | 6/2005 | Shay et al. |
| 7,398,972 | B2 | 7/2008 | Schuller et al. |
| 7,434,728 | B2 | 10/2008 | Paulson et al. |
| 9,904,876 | B2 | 2/2018 | Alvig et al. |
| 10,889,129 | B2 | 1/2021 | Beech |
| 2006/0102035 | A1 | 5/2006 | Schmitt et al. |
| 2007/0013757 | A1 * | 1/2007 | Ohnishi ..................... B41J 3/28 347/102 |
| 2007/0157836 | A1 * | 7/2007 | Schmitt .................... B41J 3/407 101/425 |
| 2010/0020151 | A1 | 1/2010 | Jones et al. |
| 2013/0220984 | A1 | 8/2013 | Cronin et al. |
| 2013/0293609 | A1 * | 11/2013 | Ohkawa ..................... B41J 2/01 347/9 |
| 2014/0002562 | A1 | 1/2014 | Zhang et al. |
| 2016/0203399 | A1 | 7/2016 | Cox |
| 2018/0194144 | A1 * | 7/2018 | Beech ...................... B41J 13/12 |
| 2018/0257416 | A1 | 9/2018 | Wooldridge et al. |
| 2018/0326763 | A1 | 11/2018 | Wooldridge et al. |
| 2019/0030917 | A1 | 1/2019 | Ohnishi |
| 2019/0105684 | A1 * | 4/2019 | Veis ...................... B41F 23/045 |
| 2021/0086530 | A1 | 3/2021 | Hinnenkamp |

OTHER PUBLICATIONS

Supplementary European Search Report from European Patent Office dated Apr. 25, 2025, for Application No. EP22841577.

* cited by examiner

Fig. 5
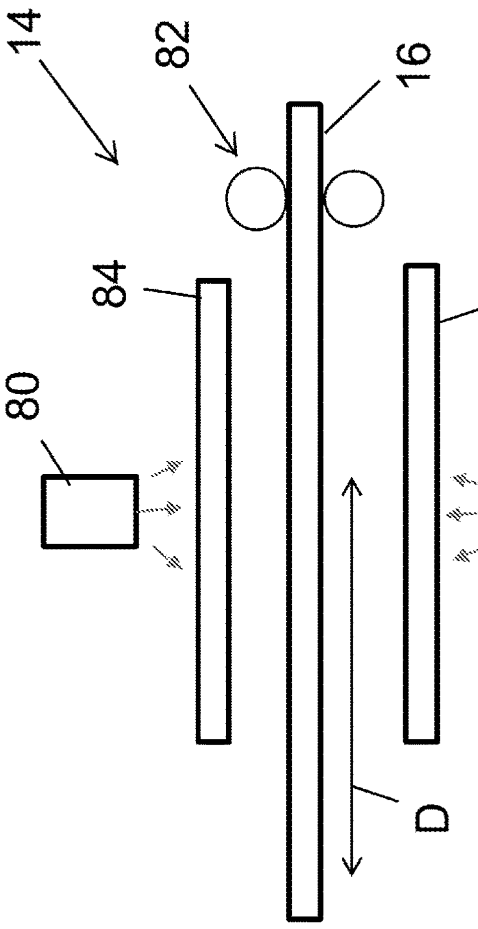
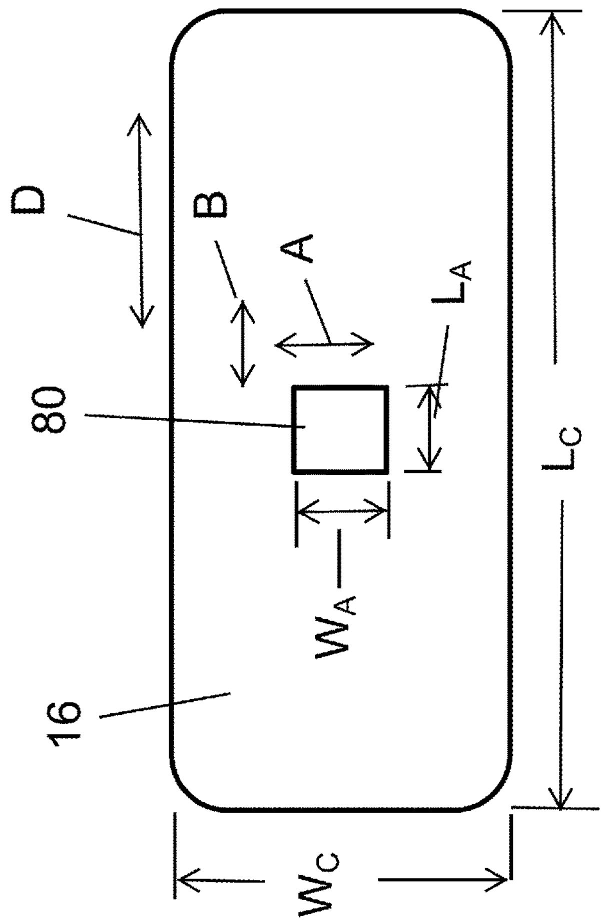
Fig. 6

PLASTIC CARD PRINTING WITH RADIATION CURABLE MATERIAL AND MULTIPLE CURING PASSES

FIELD

This technical disclosure relates to printing on surfaces of plastic or composite cards such as financial (e.g., credit, debit, or the like) cards, driver's licenses, national identification cards, business identification cards, gift cards, and other plastic or composite cards which bear personalized data unique to the cardholder and/or which bear other card information.

BACKGROUND

It is known to print on the surface of a plastic card using radiation curable materials including inks and varnishes. After being applied to the surface, radiation, such as ultraviolet (UV) radiation, is used to cure the applied radiation curable material. The use of radiation curable material improves the durability (for example, abrasion resistance, chemical resistance, and adhesion) of the printed material on the surface of the plastic card. It has been observed that the plastic card has a tendency to bow or curl in a direction toward the UV light source. This bow or curl in the plastic card needs to be removed or reduced to be in compliance with accepted industry standards before the plastic card can be issued to the intended card holder.

SUMMARY

Techniques are described herein for reducing or eliminating a bow in a plastic card that results from applying radiation, such as UV radiation, to a surface of the plastic card to cure radiation curable material that has been applied to the surface. In one embodiment, the bow in the plastic card is reduced to an extent whereby the plastic card is in compliance with an industry accepted standard, such as but not limited to ISO 7810:2019, Clause 8.10, for bow or curl in a plastic card to be issued to a card holder. ISO 7810:2019, Clause 8.10 indicates that the maximum distance from a flat rigid plate to any portion of the surface of an ID-1 size plastic card shall not be greater than 1.5 mm (0.06 inches) including the card thickness. In other words, the total height of the plastic card, which includes both any bow in the card and the card thickness, is equal to or less than about 0.06 inches. Some plastic cards, such as financial cards, have a thickness of about 0.03 inches, thereby permitting a maximum bow of about 0.03 inches.

The term "plastic card" used herein and in the claims refers to the type of cards that are referred to in the industry as a plastic card or a composite card, that are constructed primarily of one or more plastic materials such as polyvinyl chloride (PVC), polycarbonate, a combination of polyester and PVC, polyethylene terephthalate glycol (PETG), and other materials known in the art. Plastic cards include, but are not limited to, financial (e.g., credit, debit, or the like) cards, driver's licenses, national identification cards, business identification cards, gift cards, and other plastic cards which bear personalized data unique to the cardholder and/or which bear other card information.

The radiation curable material can be any type of radiation curable material that can be applied to the surface of the plastic card. Examples of radiation curable materials include, but are not limited to, inks, varnishes, coatings and/or protective materials, and others. The radiation curable material can be applied to the surface of the plastic card using any print process that is suitable for applying the radiation curable material. In one embodiment, the radiation curable material can be applied from a ribbon in a thermal transfer print process, applied using one or more drop-on-demand (DOD) print heads in a DOD print process, or applied using a combination of a ribbon and a DOD print head.

One or more of the techniques described herein can be used in a simplex printing process where only a single surface of the plastic card is printed with radiation curable material. In addition, one or more of the techniques described herein can be used with a duplex printing process where each surface of the plastic card is printed with radiation curable material.

In one embodiment, a plastic card printing method described herein can include inputting a plastic card having a first surface and a second surface into a plastic card printing system that has a print station that is configured to print radiation curable material. In the print station, radiation curable material is printed on the plastic card. After printing of the radiation curable material on the plastic card is complete, radiation is applied to the plastic card. The radiation can cure the radiation curable material printed on the plastic card, which can be printed on one or both surfaces of the plastic card. In another embodiment, the radiation can be applied to a non-printed surface of the card to counteract any bowing that may have taken place as a result of curing the radiation curable material applied to the opposite surface. The radiation can be applied using a radiation source. The radiation source may be a single radiation emitter or an array of radiation emitters. Each one of the radiation emitters may have a common nominal wavelength. After applying the radiation, a total height of the plastic card is 0.06 inch or less so that the plastic card is in compliance with ISO 7810:2019, Clause 8.10. Thereafter, the plastic card is output from the plastic card printing system.

In another embodiment, a method of printing on a plastic card having a first surface and a second surface can include printing first radiation curable material on the first surface of the plastic card and printing second radiation curable on the second surface of the plastic card. After printing of the first radiation curable material on the first surface and the second radiation curable material on the second surface is complete, radiation is applied to the first surface to cure the first radiation curable material and radiation is applied to the second surface to cure the second radiation curable material. The radiation can be applied to the first surface first, following by applying the radiation to the second surface. In another embodiment, the radiation can be applied to the second surface first, following by applying the radiation to the first surface. In still another embodiment, the radiation can be applied to the first surface and the second surface simultaneously. The radiation can be applied using a radiation source, for example an array of radiation emitters where each one of the radiation emitters have a common nominal wavelength.

In still another embodiment, a plastic card printing method can include inputting a plastic card having a first surface and a second surface into a plastic card printing system that has a print station that is configured to print radiation curable material. In the print station, the radiation curable material is printed on the plastic card. Radiation is then applied to the radiation curable material on the plastic card with an irradiance of at least about 12 W/cm$^2$ until the radiation curable material is cured. The radiation can be applied after one side of the card is printed, or after both sides of the card are printed. Once curing is complete, the plastic card is output from the plastic card printing system.

In another embodiment, a plastic card printing method described herein can include inputting a plastic card having a length and a width into a print station of a plastic card printing system, where the print station is configured to print radiation curable material. Radiation curable material is then printed on at least one surface of the plastic card. After printing the radiation curable material, the plastic card is mechanically transported to a curing station having a curing lamp with one or more light emitting diodes. The radiation curable material on the at least one surface is then cured by applying radiation to the radiation curable material in multiple curing passes of the plastic card and the curing lamp relative to one another.

In another embodiment, a plastic card printing system described herein can include a print station that is configured to print a radiation curable material on a plastic card, and a mechanical card transport mechanism configured to transport the plastic card in the print station in a card transport direction. The system further includes a curing station having a curing lamp with at least one radiation emitter. The curing lamp may include an array of light emitting diodes that emit radiation. In an embodiment, each one of the light emitting diodes can have a common nominal wavelength. The curing lamp is movable in a direction perpendicular to the card transport direction. In addition, in an embodiment, the radiation that impinges on the card surface(s) can have an irradiance of at least about 12 $W/cm^2$. The print station can be configured as a thermal transfer print station with a thermal print head and the radiation curable material can be on a ribbon. In another embodiment, the print station can be configured to perform DOD printing and the radiation curable material can be a liquid material.

DRAWINGS

FIG. 5 illustrates an embodiment of a radiation curing station of the plastic card printing system.

FIG. 6 is a top plan view showing the curing lamp of the radiation curing station relative to the plastic card.

DETAILED DESCRIPTION

Figure 1:
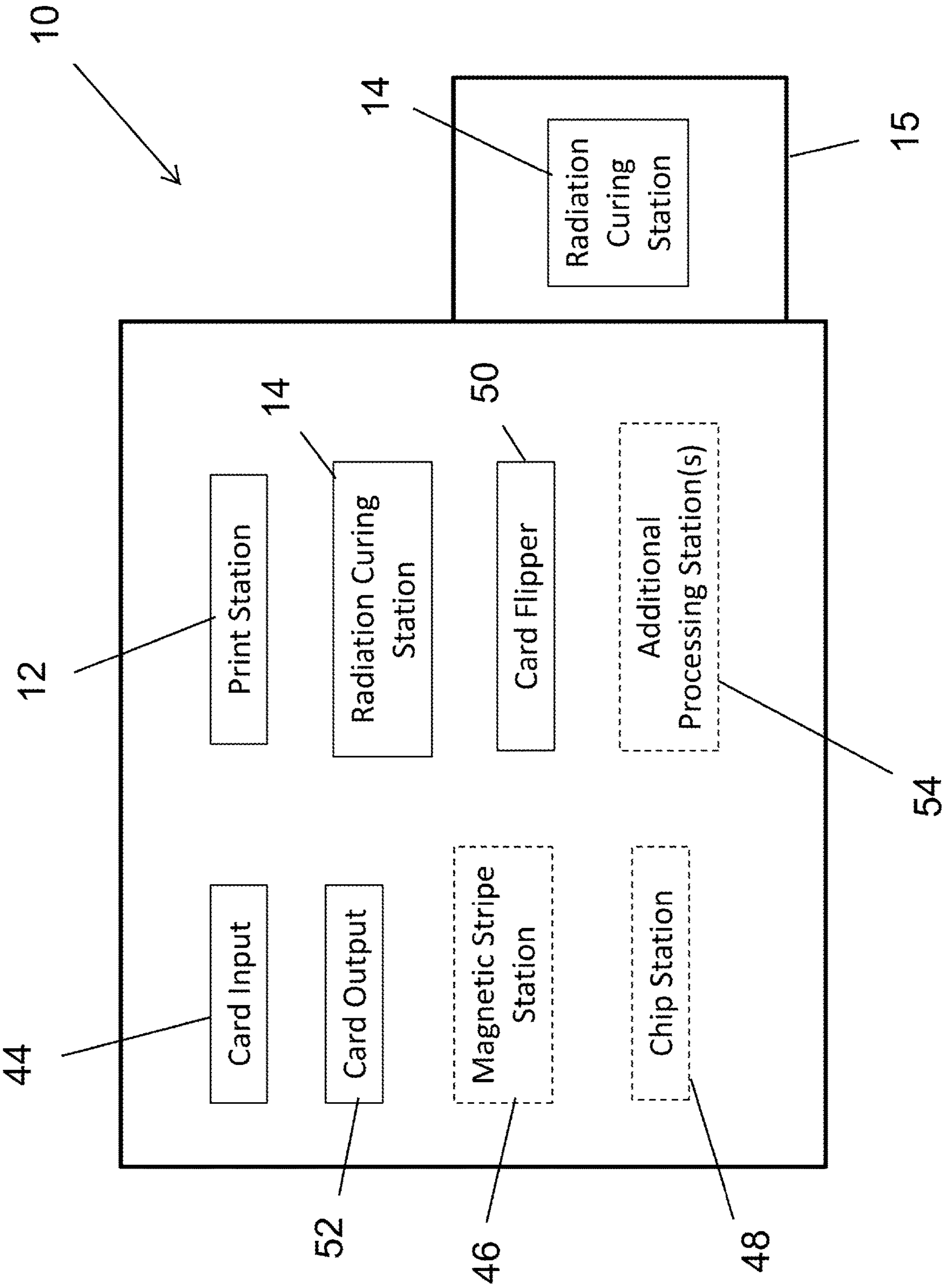
FIG. 1 is a schematic illustration of an embodiment of a plastic card printing system described herein.

The following is a detailed description of techniques for reducing or eliminating bowing or curling in a plastic card that results from applying radiation, such as UV radiation, to a surface of the plastic card to cure radiation curable material that has been applied to the surface. The amount of bowing that is permitted in a plastic card to be issued to the card holder is governed by ISO 7810:2019, Clause 8.10 which indicates that the maximum distance from a flat rigid plate to any portion of the surface of an ID-1 size plastic card shall not be greater than 1.5 mm (0.06 inches) including the card thickness. In other words, the total height of the plastic card, which includes both any bow in the card and the card thickness, is equal to or less than about 0.06 inches. Some plastic cards, such as financial cards, have a thickness of about 0.03 inches, thereby permitting a maximum bow in the plastic card of about 0.03 inches to comply with ISO 7810:2019, Clause 8.10. The techniques described herein eliminate or reduce bowing in the plastic card to about 0.03 inch or less so that the plastic card is in compliance with ISO 7810:2019, Clause 8.10.

The plastic card described herein is constructed completely or primarily of one or more plastic materials such as PVC, polycarbonate, a combination of polyester and PVC, PETG, and other materials known in the art. The plastic card may include non-plastic or composite components. A plastic card includes, but is not limited to, a financial (e.g., credit, debit, or the like) card, a driver's license, a national identification card, a business identification card, a gift card, and other plastic cards which bear personalized data unique to the cardholder and/or which bear other card information.

One or more of the techniques described herein may be applicable to simplex printing, i.e. printing on only one side of the plastic card with radiation curable material. One or more of the techniques described herein may be applicable to duplex printing, i.e. printing on both sides of the plastic card with radiation curable material.

In one embodiment described herein, both sides of the card can be printed with radiation curable material. In one embodiment, the radiation curable material printed on each side of the card can be the same type of material, for example colored inks of the same and/or different colors. In another embodiment, the radiation curable material printed on each side of the card can be different types of material, for example colored ink(s) on one side and material(s) such as a varnish, coating or protective material on the other side. In another embodiment, the radiation curable material printed on each side of the card can be the same type of material as well as different types of material. Accordingly, language such as printing first radiation curable material on the first surface of the plastic card and printing second radiation curable on the second surface of the plastic card (or the like) is to be interpreted as the first and second radiation curable materials being the same type of materials, the first and second radiation curable materials being different materials, or the first and second radiation curable materials including some materials of the same type and different materials. In addition, the term print radiation curable material (or the like) is to be interpreted as printing a single radiation curable material, or printing different types of radiation curable materials.

Once all of the printing on both surfaces is completed, radiation is then applied to the surfaces to cure the printed radiation curable material. In another embodiment described herein, only one side of the card is printed with radiation curable material, and the radiation curable material is then cured. Optionally, a non-printed side of the card may be exposed to radiation after curing the radiation curable material to counteract any bow in the card that may be created during curing of the radiation curable material on the opposite surface.

In another embodiment described herein that is applicable to both simplex printing and duplex printing on the plastic card, bowing of the plastic card can be minimized by utilizing multiple curing passes of the curing lamp and the plastic card relative to one another. The curing passes can be in the width or short-direction of the plastic card, in the length or long-direction of the plastic card, at an angle to the width or length of the plastic card, or combinations thereof.

Figure 2:
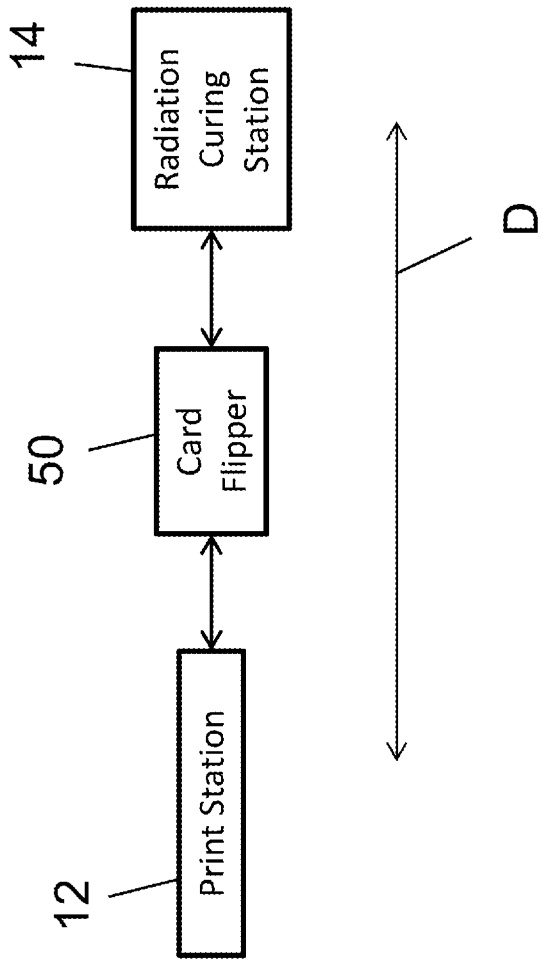
FIG. 2 depicts an example arrangement of a portion of a plastic card printing system.

Referring to FIG. 1, an example of a plastic card printing system 10 is illustrated. The system 10 includes at least a print station 12 and a radiation curing station 14. The system 10 is configured to personalize a plastic card by printing on one or more surfaces of the plastic card. As best seen in FIG. 2, in the print station 12 and the radiation curing station 14, the plastic card may travel generally in a card transport direction D along a card transport path which may be linear. Transport of the plastic card in the system 10 is achieved using suitable transport mechanisms known in the art including rollers, belts, tabbed belts, and combinations thereof. The transport mechanisms may be configured to transport the plastic card in a single, forward direction, or the transport mechanisms may be reversible to transport the plastic card in forward and reverse directions. Card transport mechanisms are well known in the art including those disclosed in U.S. Pat. Nos. 6,902,107, 5,837,991, 6,131,817, and 4,995,501 and U.S. Published Application Nos. 2013/0220984 and 2018/0326763, each of which is incorporated herein by reference in its entirety. A person of ordinary skill in the art would readily understand the type(s) of card transport mechanisms that could be used, as well as the construction and operation of such card transport mechanisms.

Figure 3A:
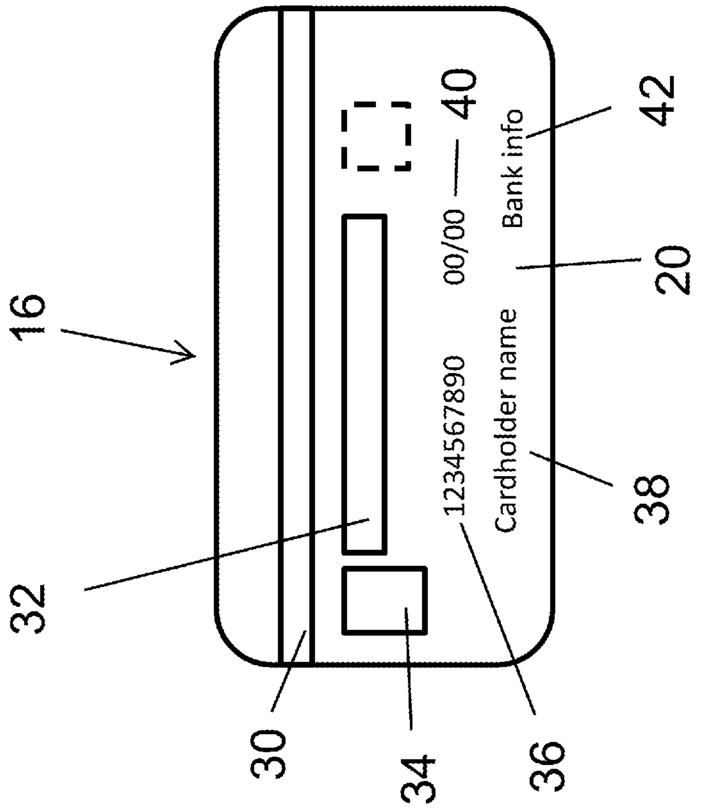
FIG. 3A illustrates an embodiment of a first or front surface of a plastic card.
Figure 3B:
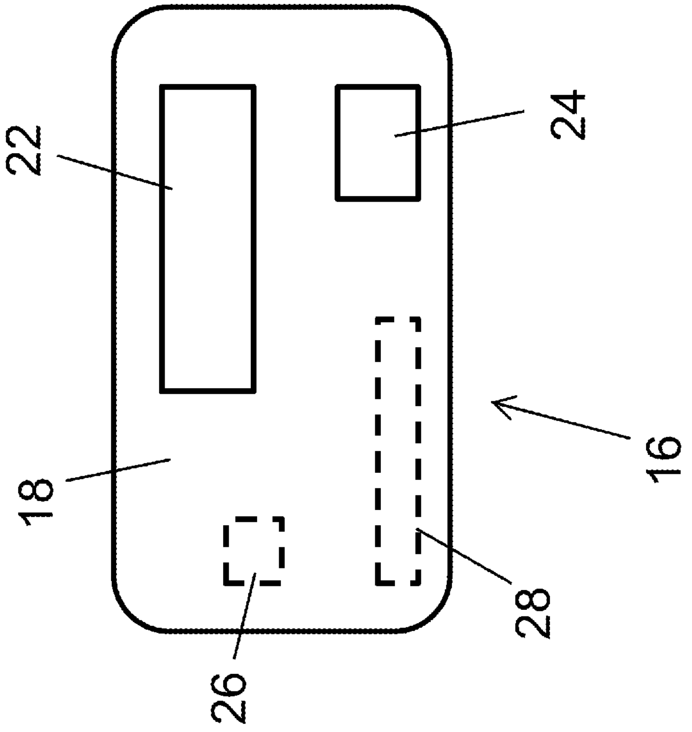
FIG. 3B illustrates an embodiment of a second or back surface of the plastic card.

FIGS. 3A and 3B illustrate an example of a plastic card 16. In this example, the card 16 is shown to include a front or first surface 18 (FIG. 3A) and a rear, back or second surface 20 (FIG. 3B) opposite the front surface 18. Simplex printing refers to printing with radiation curable material occurring on either the front surface 18 or the rear surface 20, but not both surfaces. Duplex printing refers to printing with radiation curable material occurring on each of the front surface 18 and the rear surface 20.

Many possible layouts for the front surface 18 are possible. For example, the front surface 18 can include account information, a horizontal card layout, a vertical card layout, and other known layout configurations and orientations. In the illustrated example in FIG. 3A, the front surface 18 can include first printed data 22 and second printed data 24. The first printed data 22 can include information on the entity that issued the card 16, such as the corporate name and/or logo of the issuing bank (for example, STATE BANK) or the card brand name (for example, VISA®, MASTERCARD®, DISCOVER®, etc.). The second printed data 24 can be, for example, the card brand name (for example, VISA®, MASTERCARD®, DISCOVER®, etc.). The front surface 18 may also include a contact or contactless integrated circuit chip 26 that can store various data relating to the card 16 such as an account number or name of the cardholder. In addition, the front surface 18 may also optionally include printed or embossed cardholder data 28 such as the cardholder name and/or an account information such as account number, expiration date and the like.

Referring to FIG. 3B, many possible layouts for the rear surface 20 are possible which may or may not have a similar layout as the front surface 18. For example, the rear surface 20 can include account information, a horizontal card layout, a vertical card layout, and other known layout configurations and orientations. In the illustrated example in FIG. 3B, the rear surface 20 can include a magnetic strip 30 that stores various data relating to the card 16 such as an account number or name of the cardholder, a signature panel 32 that provides a place for the cardholder to sign their name, and a hologram 34. The magnetic strip 30, the signature panel 32, and the hologram 34 are conventional elements found on many plastic cards. The rear surface 20 can also include printed personal data that is unique to or assigned specifically to the cardholder. For example, an account number 36 assigned to the cardholder, the name of the cardholder 38, and a card expiration date 40 can be printed on the rear surface 20. Other personal cardholder data may also be printed on the rear surface 20, such as an image of the face of the cardholder. Non-personal data 42 such as name of the issuing bank, contact information to contact the issuing bank, and the like, can also be printed on the rear surface 20.

Some or all of the printing on the front surface 18 and/or the printing on the rear surface 20 is printed using a radiation curable material applied in the print station 12. The radiation curing improves the durability (for example, abrasion resistance, chemical resistance, and adhesion) of the printing compared to the durability of printing that is printed using standard (i.e. non-radiation curable) material. The enhanced durability is sufficient to permit the plastic card to be issued to the cardholder without a protective laminate or coating applied to the front surface 18 and/or to the rear surface 20. In other words, the front surface 18 and/or the rear surface 20 can be without or devoid of a protective laminate or coating overlaying the printing. However, in an embodiment, a protective laminate or coating can be applied to overlay the printing on one or both of the front surface 18 and the rear surface 20.

Returning to FIG. 1, the radiation curing station 14 can be a stand-alone mechanism or the components of the radiation curing station 14 can be incorporated into and considered part of the print station 12. The print station 12 and the radiation curing station 14 (and some or all of the other components of the system 10) can be disposed within a common housing. Alternatively, the radiation curing station 14 can be incorporated into a module 15 that is initially separate from the system 10 but is then removably secured to the system 10 similar to the modules disclosed in U.S. Pat. No. 9,904,876 which is incorporated herein by reference in its entirety. The module 15 includes its own housing that is coupled to the housing of the system 10, which can be a desktop card printer, and receives a printed card from the system 10 and returns the card back to the system 10 after curing.

With continued reference to FIG. 1, the system 10 can further include a card input 44, an optional magnetic stripe station 46, an optional integrated circuit chip station 48, a card flipper 50 (or card reorienting mechanism), a card output 52, and optionally one or more additional card processing stations 54. The card input 44 can be a card input hopper designed to hold a plurality of plastic cards waiting to be fed one-by-one into the system 10 for processing. An example of a card input hopper is described in U.S. Pat. No. 6,902,107 which is incorporated herein by reference in its entirety. Alternatively, the card input 44 can be an input slot through which individual cards are fed one-by-one into the system 10. The card input 44 can be positioned at any location in the system 10 relative to the other elements of the system 10 that is suitable for inputting the plastic card.

The magnetic stripe station 46 is optional. If present, the magnetic stripe station 46 can verify the operation of the magnetic stripe on the plastic card and/or encode data on the magnetic stripe. An example of a magnetic stripe station is described in U.S. Pat. No. 6,902,107 which is incorporated herein by reference in its entirety.

The integrated circuit chip station 48 is also optional, and if present, is designed to verify the operation of the chip on the plastic card and/or program the chip with data. The chip station 48 can include a single chip programming station for programming a single card at a time within the station 48, or the station 48 can be configured to simultaneously program multiple cards. A chip station having simultaneous, multiple card programming is described in U.S. Pat. No. 6,695,205 (linear cassette configuration) and in U.S. Pat. No. 5,943,238 (barrel configuration) each of which is incorporated herein by reference in its entirety.

The card flipper 50 is configured to flip the card 180 degrees so that a surface thereof previously facing in one direction, for example upward, now faces in the opposite direction after being flipped. Card flippers are well known in the art. Examples of suitable card flippers are described in U.S. 2013/0220984 and U.S. Pat. No. 7,398,972 each of which is incorporated herein by reference in its entirety. In the example depicted in FIG. 2, the card flipper 50 is illustrated as being disposed between the print station 12 and the radiation curing station 14. However, other locations are possible. After the card is flipped in the card flipper 50, the card can be transported to the curing station 14 and/or to the print station 12.

The card output 52 can be a card output hopper designed to hold a plurality of processed plastic cards that are output one-by-one after being processed within the system 10. An example of a card output hopper is described in U.S. Pat. No. 6,902,107 which is incorporated herein by reference in its entirety. Alternatively, the card output 52 can be an output slot through which individual cards are output one-by-one. The card output 52 can be located anywhere in the system 10 that is suitable for the output 52.

The additional processing station(s) 54 can be other card processing mechanisms configured to perform other card processing operations. Examples of the additional processing station(s) 54 include one or more of a laminator, an indent mechanism, an embossing mechanism, a laser marking mechanism, a print mechanism that prints other than with radiation curable material, a vision/quality assurance mechanism, and others.

In one embodiment, the system 10 can be configured as a type of plastic card printing system that is referred to as a desktop card printer or desktop card printing system that is typically designed for relatively small scale, individual plastic card printing. In desktop card printers, a single plastic card to be printed is input into the system, printed, and then output. These systems are often termed desktop machines or desktop printers because they have a relatively small footprint intended to permit the machine to reside on a desktop. Many examples of desktop machines are known, such as the SD or CD family of desktop card machines available from Entrust Corporation of Shakopee, Minnesota. Other examples of desktop card machines are disclosed in U.S. Pat. Nos. 7,434,728, 7,398,972, 9,904,876 each of which is incorporated herein by reference in its entirety.

In another embodiment, the system 10 can be configured as a type of plastic card printing system that is referred to as a central issuance card processing system that is typically designed for large volume batch processing of plastic cards, often employing multiple processing stations or modules to process multiple plastic cards at the same time to reduce the overall per card processing time. Examples of central issuance card processing systems include the MX and MPR family of central issuance systems available from Entrust Corporation of Shakopee, Minnesota. Other examples of central issuance systems are disclosed in U.S. Pat. Nos. 4,825,054, 5,266,781, 6,783,067, and 6,902,107, all of which are incorporated herein by reference in their entirety.

Figure 4A:
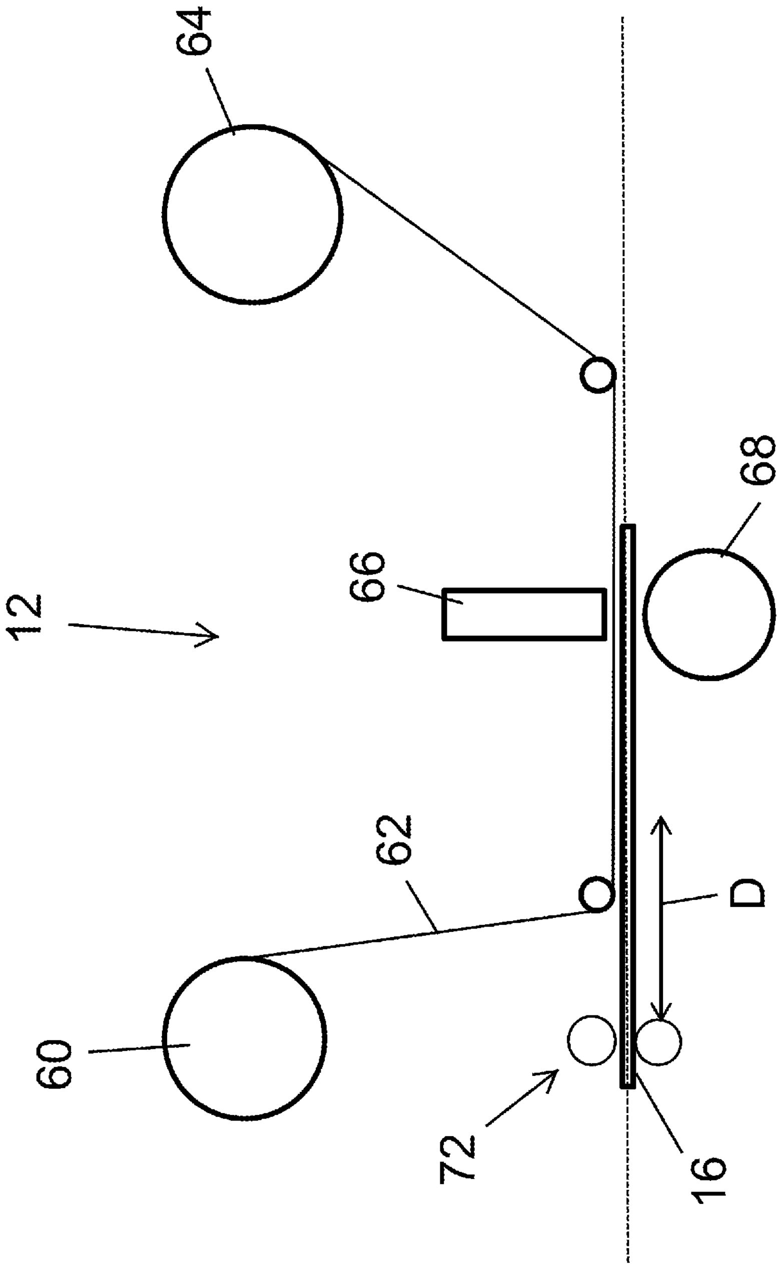
FIG. 4A illustrates an embodiment of a print station of the plastic card printing system.
Figure 4B:
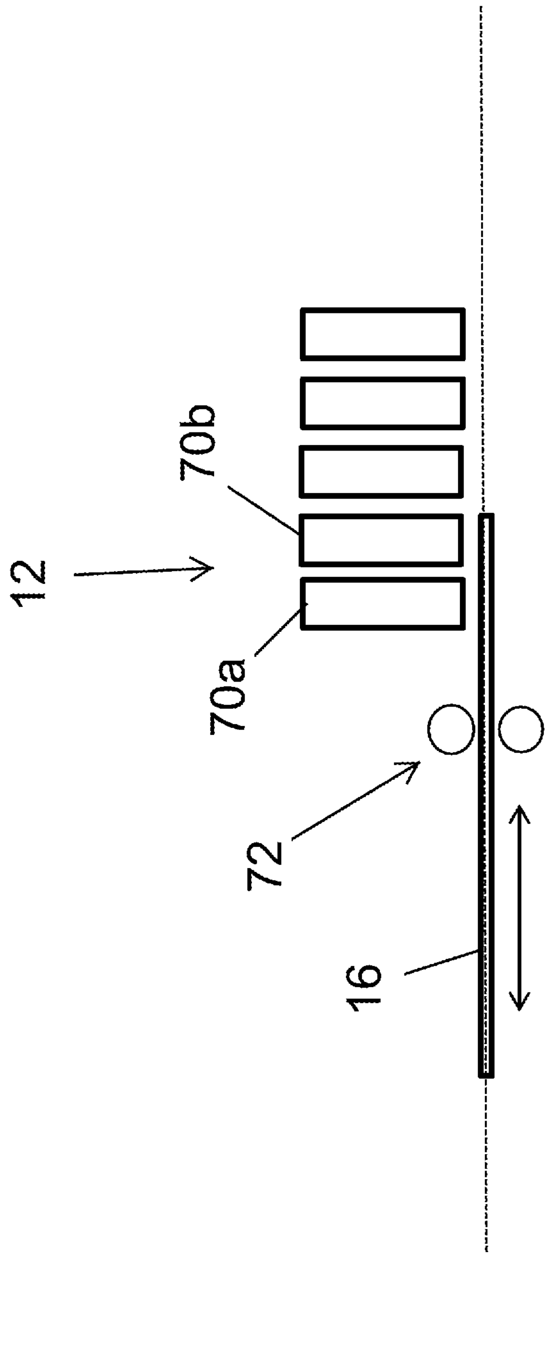
FIG. 4B illustrates another embodiment of a print station of the plastic card printing system.

FIGS. 4A and 4B illustrate different examples of the print station 12 that can be used. The print stations 12 in FIGS. 4A and 4B are configured to print one or more radiation curable materials on one or more surfaces of the plastic card. However, any type and configuration of print station that can print one or more radiation curable materials can be used. Examples of radiation curable materials that can be printed by each print station 12 includes, but is not limited to, inks, varnishes, coatings, protective materials, and others.

Referring to FIG. 4A, the print station 12 is configured as a thermal transfer printer with a ribbon supply 60 that supplies a thermal transfer print ribbon 62 having alternating panels of radiation curable ink and optionally radiation curable varnish, coating, protective material, and/or others, and a ribbon take-up 64 that takes-up used portions of the thermal transfer print ribbon 62 after printing. The print ribbon 62 is transferred along a ribbon path between the ribbon supply 60 and the ribbon take-up 64 past a thermal print head 66 that can be moved toward and away from an opposing fixed platen 68 to sandwich the print ribbon 62 and the card 16 therebetween during printing. Alternatively, the platen 68 can be movable toward and away from the print head 66 which can be stationary. The card 16 can be transported in both forward and reverse directions along the transport direction D through the print station 12 using conventional card transport mechanisms such as transport rollers. The general construction and operation of thermal transfer print stations is well known in the art.

The radiation curable ink on the thermal transfer print ribbon 62 can be pigment-based or dye-based. However, any type of radiation curable colorant material can be used as long as the radiation curable colorant material can be disposed on the thermal transfer print ribbon, can be thermally transferred from the ribbon to the card surface using a thermal print head, and once transferred to the card surface can be cured by applying radiation to the colorant material on the card surface. The thermal transfer print ribbon 62 can be a monochrome ribbon where the radiation curable ink can be a single color such as, but not limited to, black or white. In another embodiment, the thermal transfer print ribbon 62 can be a multi-color ribbon with a repeating sequence of colored panels, such as a CMYK print ribbon, where the radiation curable ink can be cyan, magenta, yellow and black. Examples of thermal transfer print ribbons with radiation curable ink thereon are described in U.S. Pat. Nos. 10,889,129; 6,850,263; 6,853,394; and 6,476,840, each of which is incorporated herein by reference in its entirety.

Referring to FIG. 4B, the print station 12 is configured as a DOD printer with one or more DOD print heads 70*a, b* . . . n, one print head for each ink color and other material, such as varnish, coatings, protective materials, and others to be printed on the card 16. Each print head 70*a, b* . . . n is in communication with an ink supply which supplies liquid ink or other supply containing a radiation curable material in liquid form. The ink supplies can be cyan, magenta, yellow and black to permit multi-color, CMYK printing, or in the case of a single one of the print heads 70*a, b* . . . n, an ink supply that supplies a single ink color can be provided.

In each of FIGS. 4A and 4B, the print station 12 will include a mechanical card transport mechanism configured to transport the plastic card 16 in the print station 12 in the card transport direction D. In one embodiment, the mechanical card transport mechanism can be one or more sets of transport rollers 72 or other card transport mechanisms known in the art.

FIG. 5 illustrates an example of the radiation curing station 14. The station 14 includes a curing lamp 80 that is positioned and controlled to emit radiation toward the plastic card 16. The card 16 is transported in the station 14 in the card transport direction D by a mechanical card transport mechanism. In one embodiment, the mechanical card transport mechanism can be one or more sets of transport rollers 82 or other card transport mechanisms known in the art. A lens 84, which is optional, separates the curing lamp 80 from the plastic card 16.

The curing station 14 is configured to apply radiation with a high irradiance to the card surface. For example, in one embodiment, the curing station 14 can be configured to apply radiation with an irradiance of at least about 12 W/cm$^2$ and no greater than about 100 W/cm$^2$. In another embodiment, the irradiance can be between about 12 W/cm$^2$ to about 40 W/cm$^2$. In another embodiment, the irradiance can be greater than or equal to about 20 W/cm$^2$ to about 40 W/cm$^2$. All subranges within the explicit ranges disclosed herein, as well as individual irradiance values within the explicit ranges and the endpoints of the explicit ranges, are contemplated and within the scope of the disclosure. A high irradiance can be achieved by, for example, minimizing the distance between the lens 84 and the card surface, minimizing the distance between the curing lamp 80 and the lens 84, and minimizing the thickness of the lens 84.

The curing lamp 80 includes at least radiation source or radiation emitter that emits radiation. In one embodiment, the curing lamp 80 can be formed by an array of light emitting diodes (LEDs) that emit UV light. In an embodiment, the curing lamp 80 may be formed by an array of twelve LEDs. The LEDs can have a common nominal wavelength. For example, in an embodiment, the common nominal wavelength can be equal to or greater than about 350 nm and less than or equal to about 405 nm. The term "nominal wavelength" refers to the rated wavelength of each one of the LEDs in the array. However, due to variables such as, but not limited to, variations in the manufacturing process and operating parameters such as temperature and current, the actual spectral output of each one of the LEDs may vary from its rated wavelength.

Referring to FIG. 6, the curing lamp 80 can be sized to have a length $L_A$ and a width $W_A$ that are less than the length $L_C$ and width $W_C$ of the card 16. This size of the curing lamp 80 means that in order to be able to apply radiation to the entire card surface, the curing lamp 80 and the card 16 must be moved relative to one another. Accordingly, in the illustrated embodiment, the card 16 is independently movable relative to the curing lamp 80 in at least the card transport direction D. In addition, the curing lamp 80 may be independently movable relative to the card 16 in the direction A. The direction A may be described as being perpendicular to the card transport direction D, or perpendicular to the length $L_C$ direction of the card 16, or parallel to the width $W_C$ direction of the card 16. In an embodiment, the curing lamp 80 may also be independently movable relative to the card 16 in the direction B, which may be described as being parallel to the card transport direction D, or parallel to the length $L_C$ direction of the card 16, or perpendicular to the width $W_C$ direction of the card 16. By moving the card 16 and the curing lamp 80 relative to one another in this manner, the entire surface of the card 16 may be exposed to radiation from the curing lamp 80. Alternatively, the relative movements of the card 16 and the curing lamp 80 may be used to apply radiation to specific areas of the card surface while not applying radiation to other areas of the card surface.

Figure 8:
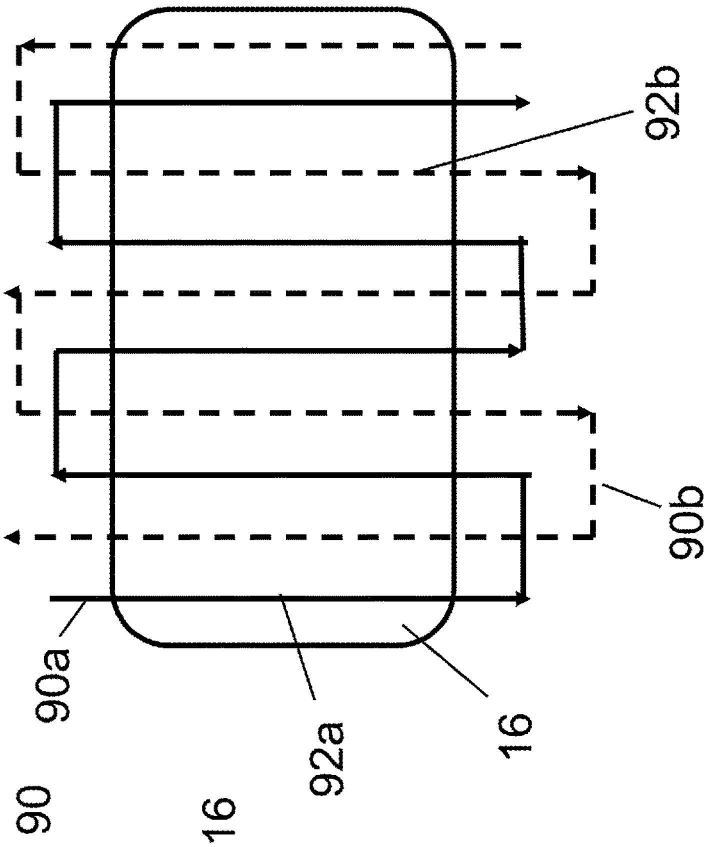
FIG. 8 depicts another example of the path of the curing lamp in another embodiment of multi-pass curing on the plastic card.
Figure 7:
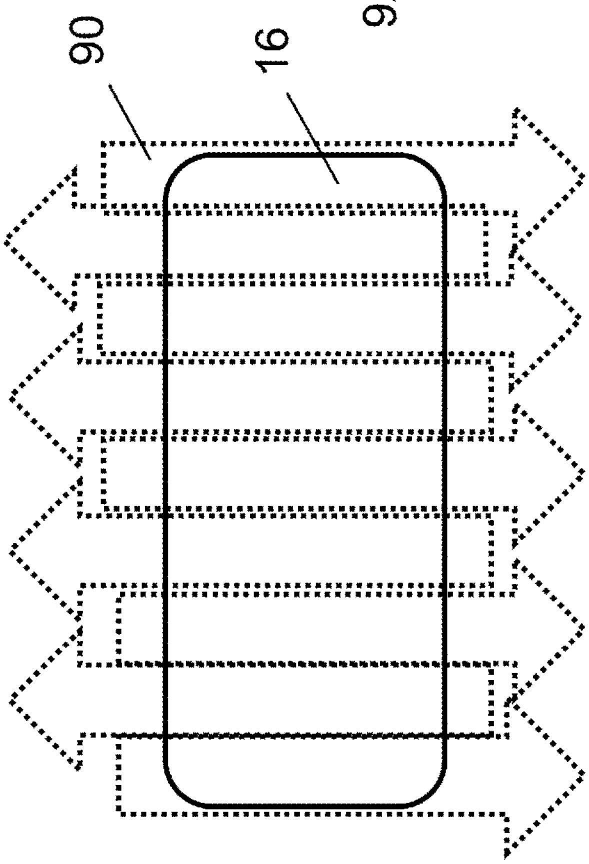
FIG. 7 depicts one example of the path of the curing lamp in one embodiment of multi-pass curing on the plastic card.
Figure 9:
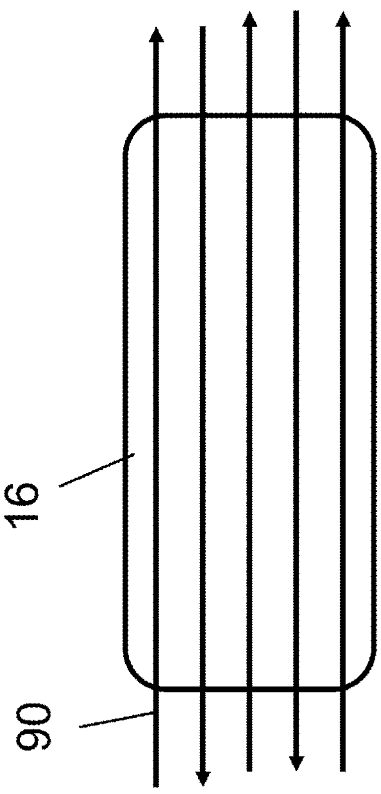
FIG. 9 depicts another example of the path of the curing lamp in another embodiment of multi-pass curing on the plastic card.

Each relative movement between the plastic card 16 and the curing lamp 80 to expose a portion of the surface of the plastic card to the emitted radiation may be referred to as a curing pass. With the curing lamp 80, a plurality of curing passes are required in order to expose the entire card surface to the radiation. FIGS. 7-9 illustrate examples of sequences of curing passes that can be implemented in order to expose the entire surface of the plastic card to the radiation. Many other curing pass sequences are possible. The curing passes can be used in simplex printing or duplex printing to cure the radiation curable material applied to one or both of the surfaces of the plastic card in the print station. In another embodiment, the curing passes can be used to expose a non-printed surface of the plastic card to radiation to reduce or eliminate bowing that may be created as a result of curing radiation curable material on an opposite surface.

In FIG. 7, the curing lamp 80 is moved relative to the plastic card 16 in the short or width direction of the plastic card in alternating curing passes 90 in the directions indicated by the arrows. After each print pass 90, the plastic card may be moved in the card transport direction D and/or the curing lamp 80 can be moved in the direction B (see FIG. 6). In each curing pass 90, a strip of the card surface that corresponds approximately to the length $L_A$ (see FIG. 6) of the curing lamp 80 is exposed to the radiation. Taken together, the curing passes 90 ensure that the entire card surface is exposed to the radiation. In an embodiment, adjacent ones of the curing passes 90 may overlap one another to some extent to ensure that the entire card surface is exposed to the radiation.

In FIG. 8, the curing lamp 80 is moved relative to the plastic card 16 in the short or width direction of the plastic card in two separate, interleaved serpentine curing passes 90*a*, 90*b* in the directions indicated by the arrows. Each serpentine curing pass 90*a*, 90*b* includes a plurality of respective legs 92*a*, 92*b* passing over the card surface. In one embodiment, the serpentine curing pass 90*a* occurs first followed by the serpentine curing pass 90*b* which is interleaved with the serpentine curing pass 90*a*. In another embodiment, the serpentine curing pass 90*b* can occur first followed by the serpentine curing pass 90*a* which is interleaved with the serpentine curing pass 90*b*. After each leg 92*a*, 92*b* of the curing passes 90*a*, 90*b*, the plastic card may be moved in the card transport direction D and/or the curing lamp 80 can be moved in the direction B (see FIG. 6). In each leg 92*a*, 92*b* of the curing passes 90*a*, 90*b*, a strip of the card surface that corresponds approximately to the length $L_A$ (see FIG. 6) of the curing lamp 80 is exposed to the radiation. Taken together, the curing passes 90*a*, 90*b* ensure that the entire card surface is exposed to the radiation. In an embodiment, adjacent ones of the legs 92*a*, 92*b* of the curing passes 90*a*, 90*b* may overlap one another to some extent to ensure that the entire card surface is exposed to the radiation.

Some plastic cards, such as PVC cards, are much more resistant to bowing in the short direction of the card. Accordingly, in the case of a PVC card or other plastic card demonstrating behavior similar to a PVC card, using curing passes in the short direction of the card helps to reduce bowing. The serpentine curing passes of FIG. 8 reduces bowing even further than the example in FIG. 7.

In FIG. 9, the curing lamp 80 is moved relative to the plastic card 16 in the long or length direction of the plastic card in the alternating curing passes 90 in the directions indicated by the arrows. During each print pass 90, the plastic card may be moved in the card transport direction D and/or the curing lamp 80 can be moved in the direction B (see FIG. 6). After each curing pass, the curing lamp 80 is moved in the direction A (see FIG. 6). In each curing pass 90, a strip of the card surface that corresponds approximately to the width $W_A$ (see FIG. 6) of the curing lamp 80 is exposed to the radiation. Taken together, the curing passes 90 ensure that the entire card surface is exposed to the radiation. In an embodiment, adjacent ones of the curing passes 90 may overlap one another to some extent to ensure that the entire card surface is exposed to the radiation.

In another embodiment, during one or more of the curing passes 90, the curing lamp 80 and the plastic card may simultaneously be moved and/or the curing lamp 80 can be simultaneously moved in the directions A and B. These simultaneous movements would permit exposure of the card surface in a curved pattern.

Referring now to FIGS. 1 and 5, examples of printing operations on a plastic card will now be described. The first example will be with respect to duplex printing and the second example will be with respect to simplex printing. In each case, a plastic card that is input into the system is printed with radiation curable material on one or both surfaces of the plastic card. After printing of the radiation curable material on the plastic card is complete, radiation is applied to the plastic card and thereafter the plastic card is output from the plastic card printing system. In duplex printing, the applied radiation is used to cure the radiation curable material on both surfaces. In simplex printing, the applied radiation is used to cure the radiation curable material on the one surface. In an optional embodiment, the opposite, non-printed surface, which is devoid of radiation curable material, may be exposed to radiation in order to further reduce any bowing that may result from curing the radiation curable material. After applying the radiation, a total height of the plastic card is 0.06 inch or less. The radiation can be applied using one of the curing sequences shown in FIGS. 7-9 or using a different sequence. In duplex printing, the curing of the printed material on the second surface reduces or eliminates the bowing in the plastic card that occurred as a result of curing the radiation curable material on the first surface.

In duplex printing, both sides of the plastic card are printed with radiation curable material. The plastic card is input into the print station 12 (for example, the station 12 illustrated in FIG. 4A or 4B) and radiation curable material is printed on a first surface (which can be either the front surface or the rear surface) of the plastic card. The card is then transported to the card flipper 50 which flips the card, and the card is returned to the print station and radiation curable material is printed on the second surface. After printing of the radiation curable material on the card is completed, the plastic card is then transported into the radiation curing station 14 and the radiation curable material on the card surfaces is cured. The radiation can first be applied to the radiation curable material on the first surface, the card can then be flipped 180 degrees in the card flipper 50 and returned back to the curing station 14 where radiation is then applied to the radiation curable material on the second surface. Alternatively, the radiation can first be applied to the radiation curable material on the second surface, the card can then be flipped 180 degrees in the card flipper 50 and returned back to the curing station 14 where radiation is then applied to the radiation curable material on the first surface. Instead of transporting the plastic card to the card flipper 50 to flip the card and returning the card to the radiation curing station 14, the radiation curing station 14 can include a second curing lamp 80' and optional lens 84' that can have constructions the same as or similar to the curing lamp 80 and the optional lens 84. The second curing lamp 80' is located on the opposite side of the card transport path from the curing lamp 80 and faces the surface of the card that is opposite the card surface faced by the curing lamp 80. The curing lamp 80' can apply radiation to one card surface simultaneously with or subsequent to the curing lamp 80 applying radiation to the opposite card surface. Alternatively, instead of the second curing lamp 80' being located in the radiation curing station 14, the second curing lamp 80' can be located in a separate radiation curing station, for example located downstream from the radiation curing station 14.

In duplex printing, instead of transporting the plastic card to the card flipper 50 to flip the card and returning the card to the print station 12 and the radiation curing station 14, a second print station similar to the print station 12 and a second radiation curing station similar to the radiation curing station 14 can be provided, for example downstream from the radiation curing station 14.

In a simplex printing operation, the plastic card is input into the print station 12 (for example, the station 12 illustrated in FIG. 4A or 4B) and radiation curable material is printed on a first surface (which can be either the front surface or the rear surface) of the plastic card. The second or opposite surface of the card is not and has not previously been printed with radiation curable material. After printing is completed, the plastic card is then transported into the radiation curing station 14 and radiation is applied to some or all of the first surface to cure the radiation curable material. The radiation can be applied using one of the curing sequences shown in FIGS. 7-9 or using a different sequence. In an optional embodiment, after curing, the plastic card may be transported to the card flipper 50 which flips the plastic card 180 degrees. The plastic card may then be transported back to the radiation curing station 14 and radiation may then be applied to the second surface of the plastic card, which has not been printed with radiation curable material, which further reduces or eliminates the bowing in the plastic card that may have occurred as a result of curing the radiation curable material on the first surface. If used, the radiation can be applied to the second surface of the plastic card using one of the curing sequences shown in FIGS. 7-9 or using a different sequence. The entire area of the second surface may be exposed to the radiation, or only a portion of the second surface may be exposed to the radiation.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A plastic card printing method, comprising:

inputting a plastic card having a first surface and a second surface into a plastic card printing system that has a print station that is configured to print radiation curable material;

in the print station, printing the radiation curable material on the plastic card;

after printing of the radiation curable material on the plastic card is complete, applying radiation to the plastic card using an array of radiation emitters where each one of the radiation emitters has a common nominal wavelength, wherein after applying the radiation a total height of the plastic card is 0.06 inch or less; and thereafter outputting the plastic card from the plastic card printing system.

2. The plastic card printing method of claim 1, wherein printing the radiation curable material on the plastic card comprises printing the radiation curable material on the first surface and on the second surface, and after printing of the radiation curable material on the first surface and the second surface is complete, applying radiation to the first surface and to the second surface.

3. The plastic card printing method of claim 2, wherein the radiation curable material printed on the first surface and the second surface comprises the same type of radiation curable material.

4. The plastic card printing method of claim 1, wherein printing the radiation curable material on the plastic card comprises printing the radiation curable material on the first surface, and after printing of the radiation curable material on the first surface applying radiation to the first surface.

5. The plastic card printing method of claim 1, wherein the plastic card includes a length and a width, and the radiation is applied using a curing lamp that includes the array of radiation emitters; and comprising while applying the radiation to the plastic card moving the plastic card and the curing lamp relative to one another in a direction parallel to the width of the plastic card.

6. The plastic card printing method of claim 5, wherein the curing lamp has a width that is less than the width of the plastic card.

7. The plastic card printing method of claim 1, wherein the print station is configured for thermal transfer printing using a thermal transfer print ribbon, and the radiation curable material comprises radiation curable ink on the thermal transfer print ribbon.

8. The plastic card printing method of claim 1, wherein the plastic card comprises a polyvinyl chloride card.

9. The plastic card printing method of claim 1, comprising applying the radiation to the plastic card with an irradiance of at least about 12 $W/cm^2$.

10. The plastic card printing method of claim 1, wherein the array of radiation emitters comprises a plurality of light emitting diodes.

11. A plastic card printing method, comprising:

inputting a plastic card having a length and a width into a print station of a plastic card printing system, the print station is configured to print radiation curable material;

printing the radiation curable material on at least one surface of the plastic card;

after printing the radiation curable material, mechanically transporting the plastic card to a curing station having a curing lamp that has a width that is less than the width of the plastic card and a length that is less than the length of the plastic card; and curing the radiation curable material on the at least one surface by applying radiation to the radiation curable material in multiple curing passes of the plastic card and the curing lamp relative to one another.

12. The plastic card printing method of claim 11, wherein each curing pass of the multiple curing passes comprises moving the plastic card and the curing lamp relative to one another in a direction parallel to the width of the plastic card.

13. The plastic card printing method of claim 11, wherein each curing pass of the multiple curing passes comprises moving the plastic card and the curing lamp relative to one another in a direction parallel to the length of the plastic card.

14. A plastic card printing system, comprising:

a print station that is configured to print a radiation curable material on a plastic card, and a mechanical card transport mechanism configured to transport the plastic card in the print station in a card transport direction;

a curing station having a curing lamp that has a width that is less than a width of the plastic card and a length that is less than a length of the plastic card; and the curing lamp is movable in a direction perpendicular to the card transport direction.

15. The plastic card printing system of claim 14, further comprising a card reorienting mechanism that can receive the plastic card and flip the plastic card.

16. The plastic card printing system of claim 14, wherein the curing lamp is configured to apply radiation with an irradiance of at least about 12 $W/cm^2$.

17. The plastic card printing system of claim 14, wherein the plastic card printing system comprises a desktop card printer system or a central issuance card system.

18. The plastic card printing system of claim 14, wherein the curing lamp comprises an array of light emitting diodes that have a common nominal wavelength.

19. The plastic card printing system of claim 14, wherein the print station comprises a thermal print head and a thermal transfer print ribbon, and the thermal transfer print ribbon includes radiation curable ink thereon.

* * * * *